No. 887,592. PATENTED MAY 12, 1908.
T. M. & R. W. CREPAR.
MOWER.
APPLICATION FILED JUNE 29, 1907.
2 SHEETS—SHEET 2.
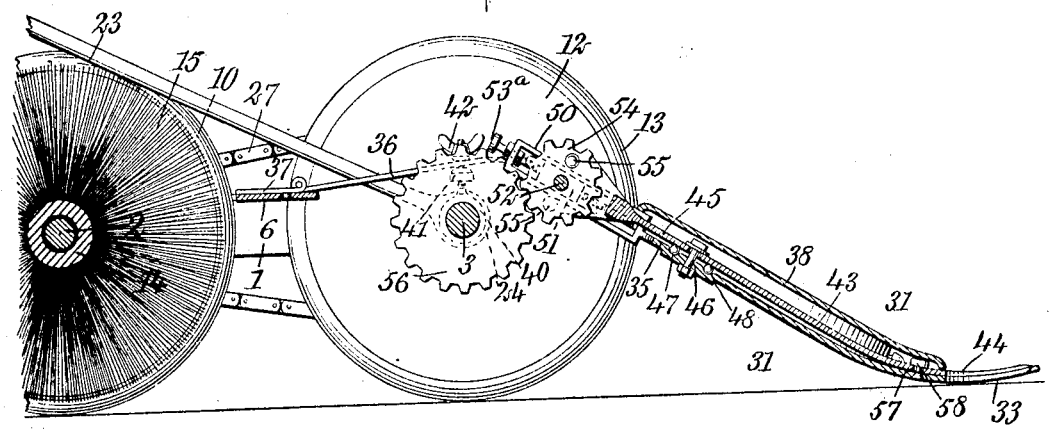
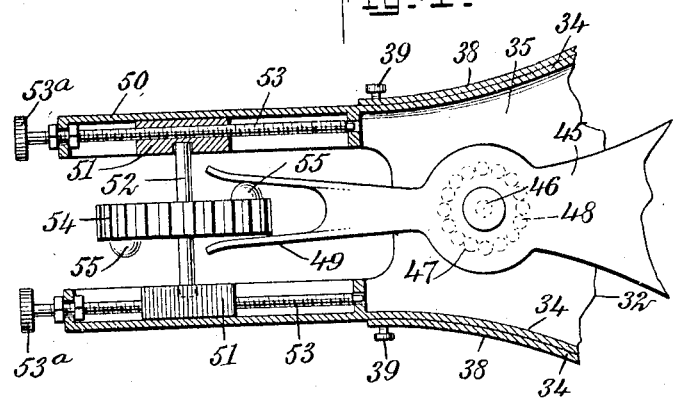
WITNESSES
INVENTOR
Thomas M. Crepar
Rosetta W. Crepar
BY
ATTORNEYS

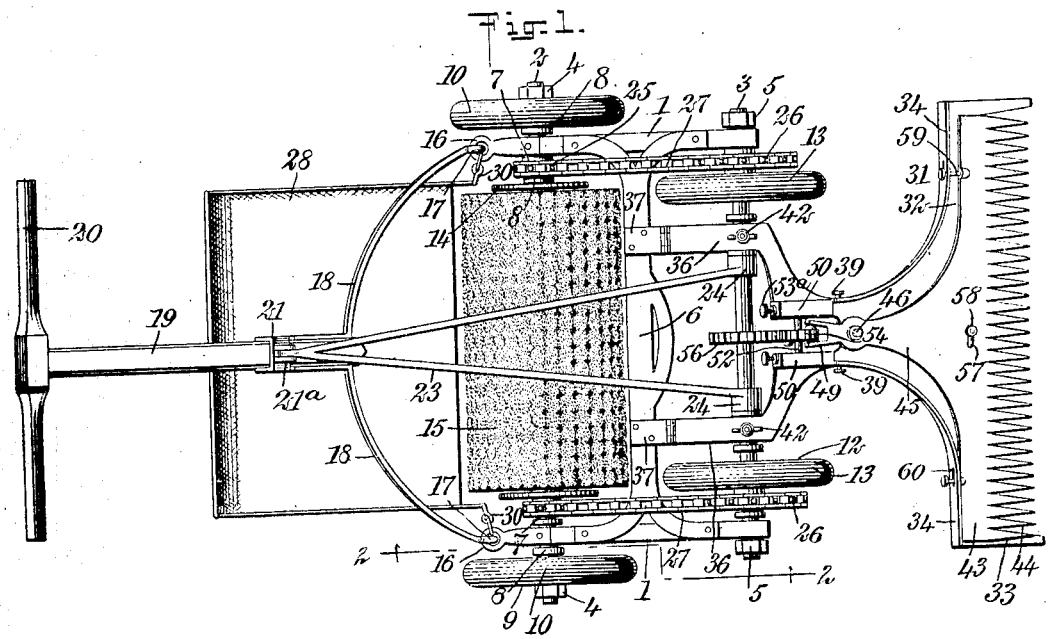

UNITED STATES PATENT OFFICE.

THOMAS MORTIMER CREPAR AND ROSETTA WINSTON CREPAR, OF FARGO, NORTH DAKOTA.

MOWER.

No. 887,592.

Specification of Letters Patent.

Patented May 12, 1908.

Application filed June 29, 1907. Serial No. 381,482.

*To all whom it may concern:*

Be it known that we, THOMAS MORTIMER CREPAR and ROSETTA WINSTON CREPAR, both citizens of the United States, and residents of Fargo, in the county of Cass and State of North Dakota, have invented a new and Improved Mower, of which the following is a full, clear, and exact description.

This invention relates to mowers, and more particularly to lawn mowers.

The object of the invention is to provide a simple, strong and efficient mower particularly adapted for the cutting of lawns, grass-plots and the like, and having a clipper arranged to be operated by the movement of the mower itself.

A further object of the invention is to provide a mower having an automatically operated clipper which can be adjusted to cut to any desired degree of closeness, and which is mounted upon a wheeled frame and coöperates with a brush similarly operated by the mower, for advancing the severed grass to a receptacle.

A further object of the invention is to provide a mower having the cutter or clipper so arranged at the front of the mower frame that it can operate under over-hanging obstructions such as bushes, hedges and the like, that it can be easily maneuvered in cutting irregularly bounded lawns, for instance, around flower-beds and the like, and by means of which the grass can be severed close up to obstructions such as tree trunks, walls and paths.

The invention consists in the construction and combination of parts to be more fully described hereinafter and particularly pointed out in the claims.

Reference is to be had to the accompanying drawings forming a part of this specification, in which similar characters of reference indicate corresponding parts in all the views and in which Figure 1 is a plan view of our invention showing the clipper cover removed; Fig. 2 is a section on the line 2—2 of Fig. 1; Fig. 3 is an enlarged longitudinal section showing a part of the mower; and Fig. 4 is an enlarged horizontal section of a detail of the clipper.

Before proceeding to a more detailed explanation of our invention it should be understood that many of the lawn mowers in use at the present time while possessing many advantages and of excellent design, are difficult to maneuver in cramped or irregularly bounded lawns, and are so constructed that it is impossible therewith to cut the grass under overhanging obstructions. This is due to the fact that the shearing or cutting blades are arranged to operate at a point intermediate of or underneath the supporting frame. In our invention, the cutter which is of a peculiarly advantageous form, is arranged at the front of the supporting frame and projects forwardly therefrom. By means of this arrangement, it is possible to cut the grass under overhanging or projecting obstructions and at the same time to cut close up to walls and the like. This feature of our invention obviates the tiresome hand clipping or cutting frequently necessary in lawn mowing, to finish the operation. Furthermore, by means of our invention the cutter can be so regulated that the grass can be severed as close as desired to the ground. In fact it can be cut as short as is possible with a hand clipper or hand shears. This feature rendersl the mower particularly useful in cutting turf, tennis-courts, golf putting greens, and the like. We provide a cylindrical brush which is automatically operated as the mower is propelled forward, and which sweeps the severed grass into a receptacle trailed behind the mower. The brush sweeps up the blades of grass far more thoroughly than it is possible to collect the same by means of a rake or the like.

Referring more particularly to the drawings, 1, 1, represent the side bars of the supporting frame, carrying at opposite ends, respectively, an axle 2 and a driving axle 3 mounted in suitable bearings. The side bars 1 of the frame are connected by a transverse member 6 having forked ends disposed longitudinally of the side bars and secured thereupon by suitable means such as bolts or rivets. The side bars may be of strong wood, metal or the like and the transverse member 6 may be of cast-iron, steel or other suitable material. The axle 2 extends laterally beyond the side bars and has rigid collars 7 and 8 at each end at opposite sides of the corresponding side bar, which hold the axle against lateral movement. Wheels 9 are mounted upon the projecting ends of the axle and are held in position thereupon by means of axle-nuts 4. The wheels 9 may be of any suitable form, though we prefer to provide them with pneumatic tires 10.

Similar wheels 12 having pneumatic tires 13 are carried by the axle 3, but at the inside of the side bars 1 of the frame. The axle 3 is held against lateral movement by means of axle-nuts 5, at the outside of the side bars. A drum 14 is loosely mounted upon the axle 2 and has a cylindrical brush 15 which may be of fiber, bristles, or any other suitable material. The brush 15 is located between the side bars of the frame near the rear of the latter. At each side of the brush, the drum 14 has sprockets 25 alined with corresponding sprockets 26 mounted upon the driving axle 3. The corresponding sprockets of the axles are operatively joined by chains 27. The sprockets of the driving axle 3 are considerably larger than the sprockets of the axle 2, so that the brush revolves at a higher rate than the axle 2 though in the same direction, and thereby the grass severed by the cutter at the forward end of the mower is rapidly and thoroughly swept from the lawn into a receptacle 28, mounted upon runners 29 and trailed by means of shackles 30 at the rear of the mower frame.

The side bars are provided with eyes 16 at their rear extremities, in which are pivotally mounted the ends 17 of curved arms 18, rigidly secured to a handle 19 having the usual cross-bar 20 and by means of which the mower is propelled. A sleeve 21 is slidably arranged upon the shank of the handle 19, and has a set screw 22 by means of which the sleeve can be locked in position at any desired point of the length of the handle 10. A V-shaped brace 23, having bearing sleeves 24 at the extremities of its sides, is pivotally mounted at a bracket 21ª of the sleeve 21. The bearing sleeves are mounted upon the frame and axle 3 at the forward part of the frame and are arranged to swing thereupon. By means of the brace and the sleeve 21, the handle of the mower can be secured rigidly at any suitable angle with the frame, and thereby can be adjusted to suit the height of any operator. Furthermore, as the handle itself is set at the rear of the frame and the brace extends to the handle from the forward part of the frame, the mower can be easily controlled by the handle, and if necessary can be pivoted about the rear wheels to raise the front part from the ground, or about the front wheels to raise the rear part from the ground.

The clipper or cutter 31 comprises a serrated plate 32 having a plurality of curved teeth 33. The serrated plate has laterally disposed flanges 34 at its rear edges and is extended to form a neck 35. The neck is bifurcated and has arms 36 terminating in hinges 37 mounted by means of rivets or in any other suitable manner, upon the cross member 6 of the supporting frame. The arms 36 extend over the driving axle 3 and are at an angle with the plane of the serrated plate and the neck, which extend downward toward the ground. The flanges 34 are curved and extend along the edges of the neck and serve to support a cutter cover 38, consisting of a plate having flanges secured to the flanges of the plate 32 by means of screws or bolts 39. The axle 3 carries thrust collars 40 adjacent to and underneath the arms 36. The thrust collars have bearing heads 41 which engage with thumb-screws 42 by means of which the cutter can be adjusted vertically. A serrated knife 43, shaped to conform to the serrated plate 32, is mounted thereupon and has teeth 44 adjacent to the teeth 33 and adapted to move transversely of the same to constitute shears therewith. The knife 43 has a neck 45 through which passes a pivot bolt 46 carried by the neck of the serrated plate. The latter has a bearing race-way 47, around the pivot bolt 46, in which are located ball or roller bearings 48. The knife is carried upon the bearings and is adapted to swing thereupon about the pivotal point. Beyond the pivot bolt 46 the neck 45 of the knife is extended and bifurcated to form a fork 49 extending into a recess formed at the neck 35 of the serrated plate adjacent to the arms 36. At the opposite edges of the recess of the neck 35 the latter has similar guideways 50 in which are located slide blocks 51 carrying therebetween a spindle 52. The guide-ways have screw rods 53, arranged in suitable openings in the end members of the guide-ways, and having heads 53ª by means of which they can be manually operated. The screw rods pass through suitably threaded openings of the slide blocks 51, and serve to move the latter longitudinally of the guide-ways 50, carrying with the them spindle 52 and thereby adjusting the same.

A pinion 54 is rigidly mounted upon the spindle 52, and has cam projections 55 at the opposite sides. The pinion 54 extends between the sides of the fork 49 and is in mesh with a gear-wheel 56 rigidly mounted upon the driving axle 3. As the latter revolves, the pinion 54 is actuated, and the cam projections 55 thus come into alternate engagement with the opposite sides of the fork 49 and reciprocally operate the serrated knife 43, turning the latter back and forth upon the pivot bolt 46. The knife 43 has a slot 57 in which is arranged a guide pin 58 carried by the serrated plate. At the rear edges upon opposite sides of the neck, the knife 43 has guide pins 59 arranged in guide slots 60 in the flanges 34 of the serrated plate.

As the pinion 54 is operated, the knife is reciprocated and the teeth thereof move transversely of the teeth of the serrated plate, adjacent teeth of the plate and the knife thus acting together to form shears, which rapidly and thoroughly sever the blades of grass which pass therebetween as the mower is propelled over a lawn. The curved form of the plate and the knife of course tends to interfere with the smooth sliding movement of the one upon the other, but the spring of the blade is sufficient to allow for this, as the relative movement is slight. The movement can be increased or diminished by suitably moving the pinion 54 between the divergent sides of the fork 49. The position of the pinion can be adjusted as explained before, by means of the slide blocks 51. The movement of the pinion is nearly tangential to the gear-wheel 56, and thereby in the adjustment the suitable engagement of the pinion and the gear-wheel is not interfered with if the cutter frame is at the same time suitably adjusted. The closeness with which the grass can be cut by means of our mower, can easily be regulated by suitable adjustment of the cutter through the thumb-screws 42, which permit the raising or lowering of the cutter. If it is desired to cut the grass exceptionally short, the handle can be raised slightly to force the cutter into closer contact with the ground. In this case the grass is cut off to a height substantially equivalent to the thickness of the serrated plate, and as the latter is preferably from one-eighth to one-quarter of an inch in thickness the grass can be cut exceptionally short.

In applying the term "clipper" to the cutting attachment of our lawn mower we desire to indicate specifically, the particular construction described above and illustrated in the drawings, and consisting of a serrated plate and a serrated knife mounted thereupon and movable with respect thereto.

Having thus described our invention we claim as new and desire to secure by Letters Patent:—

1. In a mower, a frame having an axle, wheels supporting said axle, a handle hinged to said frame at a point remote from said axle, a sleeve slidably mounted upon said handle, a brace pivoted at one end upon said sleeve and pivoted at the opposite end upon said axle, and means for clamping said sleeve upon said handle in a plurality of positions.

2. In a mower, a wheeled frame having a driving axle, a serrated plate, a serrated knife curved about an axis transverse of the mower and movably mounted upon said plate, and means for operatively connecting said knife and said axle.

3. In a mower, a wheeled frame having a driving axle, a serrated plate, curved about an axis transverse of the mower a serrated knife operatively mounted upon said plate and arranged to move thereupon whereby adjacent serrations of said plate and said knife constitute shears, means for operatively connecting said axle and said knife, and a brush controlled by said axle.

4. In a mower, a wheeled frame having a driving axle, a curved serrated plate vertically adjustable, a curved serrated knife pivotally mounted upon said plate and arranged to move thereupon whereby adjacent serrations of said plate and said knife constitute shears, said plate and said knife being curved about an axis transverse of said frame whereby said plate and said knife tend to remain in engagement when said knife is pivotally operated, means for connecting said axle and said knife to reciprocate said knife when said axle is rotated, and a brush controlled by said axle.

5. In a mower, a wheeled frame having a driving axle, a curved serrated plate carried by said frame and vertically adjustable, a curved serrated knife pivoted upon said plate and adapted to swing transversely thereof, said plate and said knife being curved about an axis transverse of said frame means for guiding said knife upon said plate, means for connecting said knife and said axle to reciprocate said knife when said axle is rotated, and a brush carried by said frame behind said plate and said knife and controlled by said axle.

6. In a mower, a frame, a serrated plate, a serrated knife mounted upon said plate, and means for operating said knife through the movement of said frame, said plate being curved about an axis transverse of said frame, said knife being similarly curved and engaging said plate resiliently.

7. In a mower, a wheeled frame having a driving axle, a serrated plate, a serrated knife pivotally mounted upon said plate and having a fork, said knife being arranged to move upon said plate across the same, a pinion having projections at opposite faces thereof and arranged within said fork, said projections engaging alternately, the respective sides of said fork when said pinion is operated, whereby said knife is reciprocated, and a gear-wheel rigid with said axle and engaging said pinion.

8. In a mower, a wheeled frame having a driving axle, a serrated plate having arms hinged to said frame and extending over said axle, means for adjusting said plate vertically, a serrated knife pivotally mounted upon said plate and arranged to swing with respect thereto, means for guiding said knife upon said plate, operating means connecting said axle and said knife whereby the latter is reciprocally operated when said axle is rotated, and means for regulating said operating means to adjust the movement of said knife.

9. In a mower, a wheeled frame having a driving axle, a serrated plate having arms hinged to said frame and extending over said axle, means between said axle and said arms for adjusting said plate vertically, a serrated knife pivotally mounted upon said plate and having a fork, said knife being arranged to move upon said plate across the same, means for guiding said knife upon said plate, a pinion having cam projections at opposite sides thereof and arranged within said fork, said cam projections engaging alternate sides of said fork when said pinion is operated whereby said knife is reciprocated, and a gear wheel rigid with said axle and engaging said pinion.

10. In a mower, a wheeled frame having a driving axle, a serrated plate adjustably mounted upon said frame and having a recess, guide-ways located at opposite sides of said recess, a serrated knife pivotally mounted upon said plate and arranged to swing with respect thereto, a spindle having its ends adjustably arranged in said guide-ways, means for driving said spindle from said axle, and means for operating said knife from said spindle.

11. In a mower, a wheeled frame having a driving axle, a serrated plate having arms hinged to said frame and presenting a recess between said arms, means for vertically adjusting said plate, a serrated knife pivotally mounted upon said plate and having a fork at said recess, guide-ways located at opposite sides of said recess, a spindle having its ends adjustably carried in said guide-ways and having a pinion, said pinion having cams adapted alternately to engage said fork to operate said knife, and a gear-wheel on said axle and in mesh with said pinion.

12. In a mower, a wheeled frame having a driving axle, a serrated plate having arms hinged to said frame and extending over said axle, means between said axle and said arms for adjusting said plate vertically, said plate having a recess between said arms and having guide-ways at opposite sides of said recess, a serrated knife pivotally mounted upon said plate and having a fork at said recess, slide blocks in said guide-ways, adjusting members engaging said slide blocks and controlling the same, a spindle having its ends carried by said slide blocks, a pinion upon said spindle having diametrically opposed cams at the opposite sides adapted alternately to engage the sides of said fork to reciprocate said knife, and a gear-wheel upon said axle in mesh with said pinion, said guide-ways being arranged in a plane substantially tangential to said gear-wheel.

In testimony whereof we have signed our names to this specification in the presence of two subscribing witnesses.

THOMAS MORTIMER CREPAR.
ROSETTA WINSTON CREPAR.

Witnesses:
H. P. LOUGH,
MARJORY HARDY.